Figure 1:
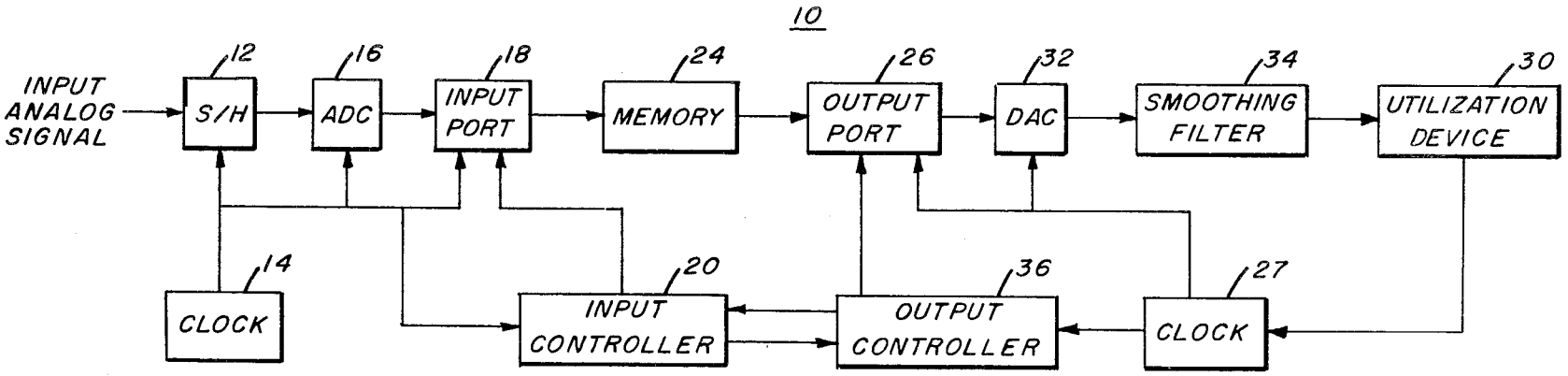
Figure 2:
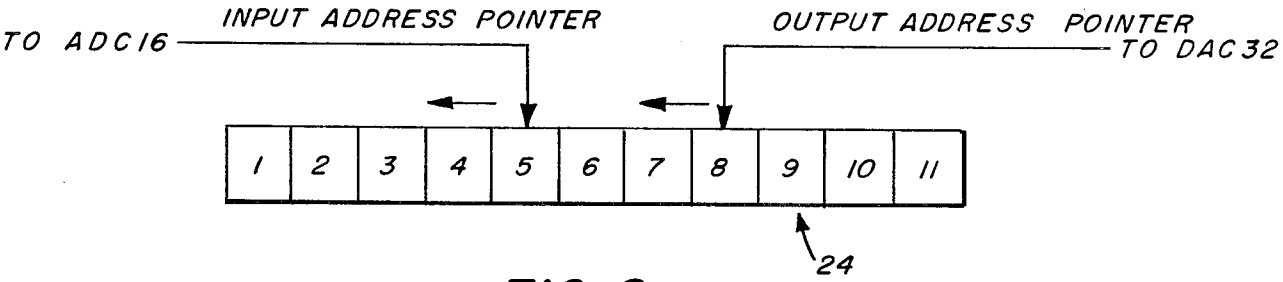

United States Defensive Publication [19] (H) [11] T964,004

Davy [43] Nov. 1, 1977

[54] TIME-BASE INSTABILITY COMPENSATION APPARATUS FOR USE IN COPY/DUPLICATION

[76] Inventor: L. Nevil Davy, 343 State St., Rochester, N.Y. 14650

[21] Appl. No.: 735,645

[22] Filed: Oct. 26, 1976

[51] Int. Cl.[2] ..... H04B 1/66

[52] U.S. Cl. ..... 179/15.55 T; 358/8; 360/36

[57] ABSTRACT

Apparatus is disclosed which compensates for time-base instabilities in analog signals representative of a document image and includes an analog-to-digital converter for digitizing such analog signals, a digital storage device, such as a read/write memory, for storing such digitized signals, and a digital-to-analog converter which is adapted to be sequentially connected to selected locations of the memory to reconstruct the input analog signals for use by a printer. The read/write memory is of a wraparound variety. Further, input and output controllers are provided, having address pointers for the memory. The input pointer causes digitized analog signals to be stored in sequence at consecutive storage locations of the memory. The output pointer removes such stored digital signals from consecutive storage locations of memory and applies them to the digital-to-analog converter. These pointers are independently incremented under the control of input (document scanner) or output operations (printer), respectively, to remove surges in data flow thereby compensating for time-base instabilities.

3 Claims, 1 Sheet Drawing,

8 Pages Specification

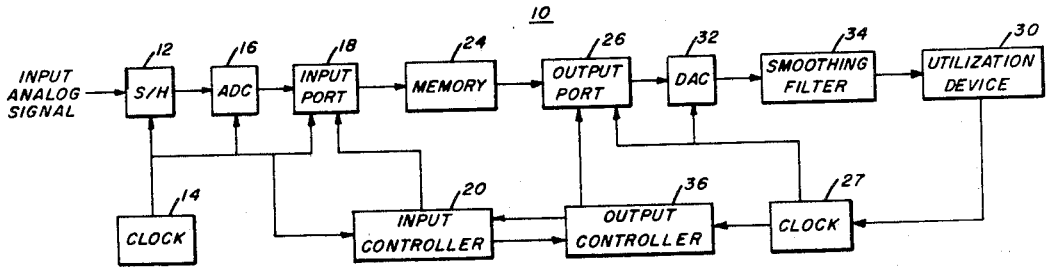

The file of this unexamined application may be inspected and copies thereof may be purchased (849 O.G. 1221, Apr. 9, 1968).